(12) United States Patent
Ahrens et al.

(10) Patent No.: US 8,459,062 B2
(45) Date of Patent: *Jun. 11, 2013

(54) APPARATUS AND METHODS FOR PRODUCING A GLASS RIBBON

(75) Inventors: Jeffrey H. Ahrens, Pine City, NY (US); Terry J. Ott, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/246,113

(22) Filed: Sep. 27, 2011

(65) Prior Publication Data

US 2013/0074549 A1  Mar. 28, 2013

(51) Int. Cl.
*C03B 17/06* (2006.01)

(52) U.S. Cl.
USPC .............. 65/195; 65/53; 65/90; 65/29.12; 65/29.18; 65/158; 65/162

(58) Field of Classification Search
USPC ............ 65/36, 53, 66, 90, 193, 195, 196, 65/199, 200, 29.12, 29.18, 158, 160, 162
See application file for complete search history.

(56) References Cited

U.S. PATENT DOCUMENTS

| | | | |
|---|---|---|---|
| 3,536,463 A | 10/1970 | Michalik et al. | 65/95 |
| 3,909,226 A | 9/1975 | McCourty et al. | 65/97 |
| 4,619,681 A | 10/1986 | Tetaz et al. | 65/29 |
| 5,400,131 A | 3/1995 | Stockley et al. | 356/33 |
| 6,015,619 A | 1/2000 | Schnabel, Jr. et al. | 428/410 |
| 6,758,064 B1 * | 7/2004 | Kariya | 65/91 |
| 6,986,268 B2 * | 1/2006 | Lee | 65/95 |
| 7,207,193 B2 * | 4/2007 | Xun et al. | 65/95 |
| 7,526,463 B2 * | 4/2009 | Collette et al. | 706/23 |
| 7,770,414 B2 | 8/2010 | Cimo et al. | 65/273 |
| 7,882,049 B2 * | 2/2011 | Collette et al. | 706/15 |
| 7,984,625 B2 * | 7/2011 | Markham et al. | 65/29.12 |
| 8,141,388 B2 * | 3/2012 | Burdette | 65/90 |
| 8,196,431 B2 * | 6/2012 | Burdette et al. | 65/29.14 |
| 8,210,001 B2 * | 7/2012 | Allan et al. | 65/53 |
| 8,354,616 B2 * | 1/2013 | Nishimoto | 219/201 |
| 2003/0076487 A1 | 4/2003 | Cannon et al. | 356/33 |
| 2005/0122025 A1 | 6/2005 | Kuin et al. | 313/408 |
| 2005/0166639 A1 | 8/2005 | Skeen et al. | 65/104 |
| 2006/0081009 A1 * | 4/2006 | Maldonado | 65/195 |
| 2007/0005525 A1 * | 1/2007 | Collette et al. | 706/15 |
| 2007/0028681 A1 * | 2/2007 | Goforth et al. | 73/159 |
| 2008/0300709 A1 * | 12/2008 | Collette et al. | 700/103 |
| 2009/0100873 A1 | 4/2009 | Allan et al. | 65/85 |
| 2010/0218557 A1 | 9/2010 | Aniolek et al. | 65/97 |
| 2012/0111055 A1 * | 5/2012 | Allan et al. | 65/29.18 |

* cited by examiner

*Primary Examiner* — Jason L. Lazorcik
(74) *Attorney, Agent, or Firm* — Kevin M. Able (57) ABSTRACT

Apparatus for producing glass ribbon includes a control device configured at least periodic thermal stress compensation of the glass ribbon by independently adjusting operation of a plurality of temperature adjustment elements based on stress characteristic information at least periodically obtained from a stress sensor apparatus. In further examples, methods of producing glass include at least periodically sensing a stress characteristic of a glass ribbon and at least periodically changing a transverse temperature profile of the glass ribbon based stress characteristic information. In further examples, methods include the step of changing a transverse temperature profile of the glass ribbon only if a measured parameter is within an operating range associated with the parameter.

8 Claims, 4 Drawing Sheets

APPARATUS AND METHODS FOR PRODUCING A GLASS RIBBON

FIELD

The present invention relates generally to apparatus and methods for producing glass ribbon and, more particularly, to apparatus and methods for producing a glass ribbon with a plurality of temperature adjustment elements.

BACKGROUND

It is known to draw a glass ribbon with a draw device. The glass ribbon may be subsequently divided to produce a plurality of glass sheets that may be employed in a wide range of applications. The glass ribbon is known to be drawn in a viscous state for eventual cooling into an elastic state where final features, such as stress characteristics, are permanently set into the glass sheet.

SUMMARY

The following presents a simplified summary of the disclosure in order to provide a basic understanding of some example aspects described in the detailed description.

In one example aspect, an apparatus for producing glass ribbon comprises a drawing device configured to draw molten glass into a glass ribbon in a draw direction along a draw plane of the apparatus. The apparatus further includes a temperature adjustment apparatus including a plurality of temperature adjustment elements positioned at respective lateral locations along at least one temperature adjustment axis extending transverse to the draw direction. The temperature adjustment elements are configured to adjust a transverse temperature profile of the glass ribbon along a width of the glass ribbon. The apparatus further includes a stress sensor apparatus configured to measure a stress characteristic of the glass ribbon at respective locations along a width of the glass ribbon. The apparatus further includes a control device configured for at least periodic thermal stress compensation of the glass ribbon by independently adjusting operation of the temperature adjustment elements based on stress characteristic information at least periodically obtained from the stress sensor apparatus.

In another example aspect, methods of producing a glass ribbon include the steps of drawing molten glass in a draw direction into a viscous zone to form a glass ribbon including opposed edges extending in the draw direction. The opposed edges are spaced apart along a width of the glass ribbon that is transverse to the draw direction. The method further includes the step of drawing the molten glass from the viscous zone into a setting zone downstream from the viscous zone. The glass ribbon is set from a viscous state to an elastic state. The method further includes the step of drawing the glass ribbon into an elastic zone downstream from the setting zone. The method still further includes the step of at least periodically sensing a stress characteristic of the glass ribbon at respective lateral locations along the width of the glass ribbon. The method further includes the step of at least periodically changing a transverse temperature profile of the glass ribbon by independently adjusting operation of a plurality of temperature adjustment elements positioned along the width of the glass ribbon in at least one of the viscous zone, the setting zone and the elastic zone. The temperature adjustment elements are independently adjusted based on stress characteristic information obtained during the step of sensing the stress characteristic.

In still another example aspect, a method of producing a glass ribbon includes the step of drawing molten glass in a draw direction into a viscous zone to form a glass ribbon including opposed edges extending in the draw direction. The opposed edges are spaced apart along a width of the glass ribbon that is transverse to the draw direction. The method further includes the step of drawing the molten glass from the viscous zone into a setting zone downstream from the viscous zone, wherein the glass ribbon is set from a viscous state to an elastic state. The method still further includes the step of drawing the glass ribbon into an elastic zone downstream from the setting zone. The method also includes the step of measuring a parameter associated with mechanically induced stress in the glass ribbon. The method further includes the step of changing a transverse temperature profile of the glass ribbon only if the measured parameter is within an operating range associated with the parameter. The temperature profile can be changed by independently adjusting operation of a plurality of temperature adjustment elements positioned along the width of the glass ribbon in at least one of the viscous zone, the setting zone and the elastic zone. The temperature adjustment elements are independently adjusted based on stress characteristic information obtained by sensing the glass ribbon at respective lateral locations along the width of the glass ribbon.

BRIEF DESCRIPTION OF THE DRAWINGS

These and other features, aspects and advantages of the present disclosure are better understood when the following detailed description is read with reference to the accompanying drawings, in which.

DETAILED DESCRIPTION

Methods will now be described more fully hereinafter with reference to the accompanying drawings in which example embodiments of the disclosure are shown. Whenever possible, the same reference numerals are used throughout the drawings to refer to the same or like parts. However, this disclosure may be embodied in many different forms and should not be construed as limited to the embodiments set forth herein.

Figure 1:
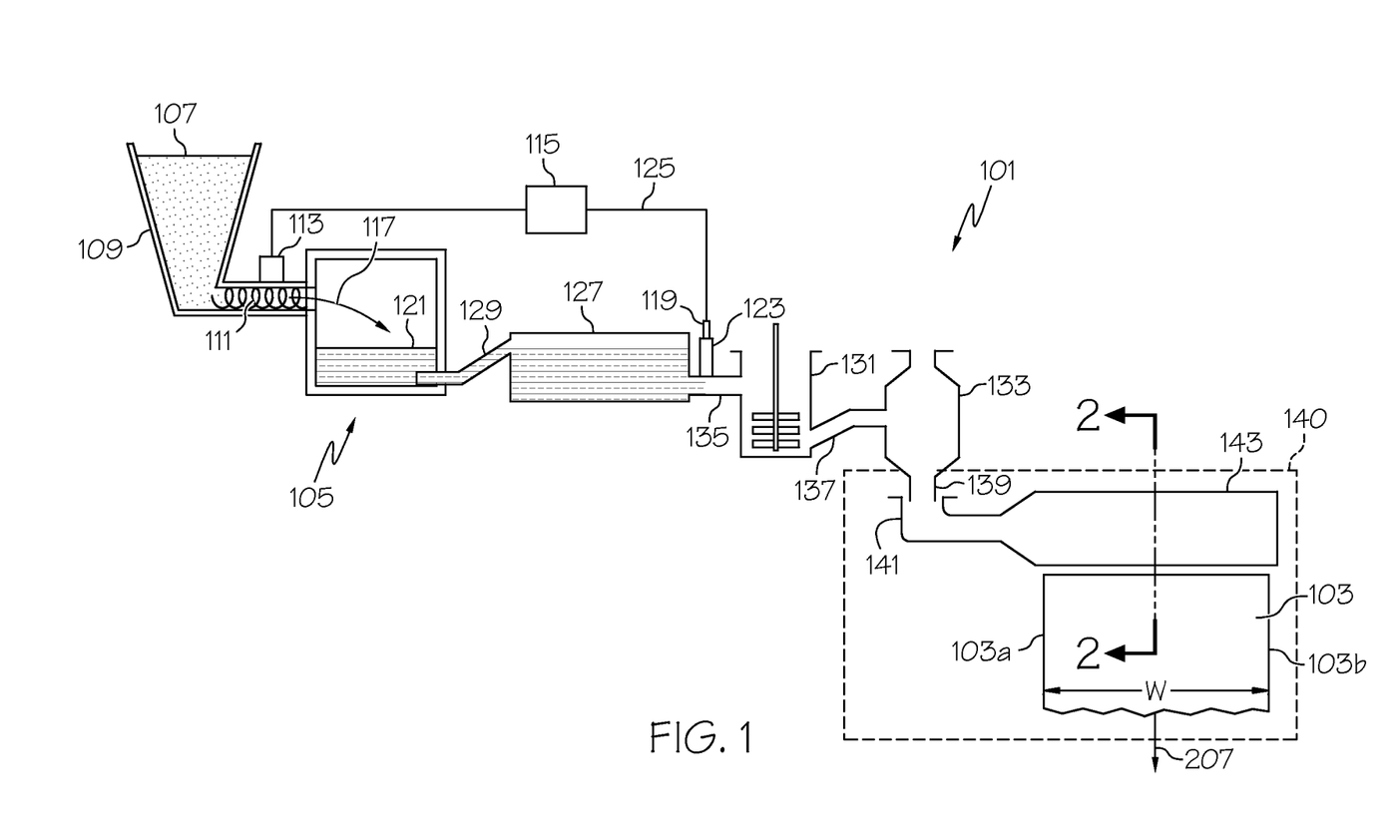
FIG. 1 is a schematic illustration of an example apparatus for producing glass ribbon in accordance is aspects of the disclosure.

Apparatus can be provided for producing a glass ribbon for subsequent processing into glass sheets. FIG. 1 schematically illustrates a fusion draw apparatus 101 although up draw, slot draw or other glass forming techniques may be used with aspects of the disclosure in further examples. With such fusion draw process techniques, the present disclosure provides for at least periodic, such as continuous, thermal stress compensation of the glass ribbon by independently adjusting operation of a plurality of temperature adjustment elements. For instance, adjustment of power to the plurality of temperature adjustment elements can help control stress within the glass ribbon before the stress profile is frozen into the ribbon as the glass ribbon enters the elastic zone as discussed more fully below. As such, by processing techniques of the present disclosure, fine tune adjustment of the transverse stress profile can be achieved to avoid stress concentrations and/or resulting optical discontinuities.

As illustrated, the fusion draw apparatus 101 can include a melting vessel 105 configured to receive batch material 107 from a storage bin 109. The batch material 107 can be introduced by a batch delivery device 111 powered by a motor 113. An optional controller 115 can be configured to activate the motor 113 to introduce a desired amount of batch material 107 into the melting vessel 105, as indicated by arrow 117. A metal probe 119 can be used to measure a molten glass 121 level within a standpipe 123 and communicate the measured information to the controller 115 by way of a communication line 125.

The fusion draw apparatus 101 can also include a fining vessel 127, such as a fining tube, located downstream from the melting vessel 105 and coupled to the melting vessel 105 by way of a first connecting tube 129. A mixing vessel 131, such as a stir chamber, can also be located downstream from the fining vessel 127 and a delivery vessel 133 may be located downstream from the mixing vessel 131. As shown, a second connecting tube 135 can couple the fining vessel 127 to the mixing vessel 131 and a third connecting tube 137 can couple the mixing vessel 131 to the delivery vessel 133. As further illustrated, a downcomer 139 can be positioned to deliver molten glass 121 from the delivery vessel 133 to a drawing apparatus. Fusion draw apparatus 101, including the illustrated fusion draw machine 140, is configured to draw molten glass into a glass ribbon as discussed more fully below. In one example, the fusion draw machine 140 can include a forming vessel 143 provided with an inlet 141 to receive molten glass from the downcomer 139.

As shown, the melting vessel 105, fining vessel 127, the mixing vessel 131, delivery vessel 133, and forming vessel 143 are examples of molten glass stations that may be located in series along the fusion draw apparatus 101.

The melting vessel 105 is typically made from a refractory material, such as refractory (e.g. ceramic) brick. The fusion draw apparatus 101 may further include components that are typically made from platinum or platinum-containing metals such as platinum-rhodium, platinum-iridium and combinations thereof, but which may also comprise such refractory metals such as molybdenum, palladium, rhenium, tantalum, titanium, tungsten, ruthenium, osmium, zirconium, and alloys thereof and/or zirconium dioxide. The platinum-containing components can include one or more of the first connecting tube 129, the fining vessel 127 (e.g., finer tube), the second connecting tube 135, the standpipe 123, the mixing vessel 131 (e.g., a stir chamber), the third connecting tube 137, the delivery vessel 133 (e.g., a bowl), the downcomer 139 and the inlet 141. The forming vessel 143 is also made from a refractory material and is designed to form the glass ribbon 103.

Figure 2:
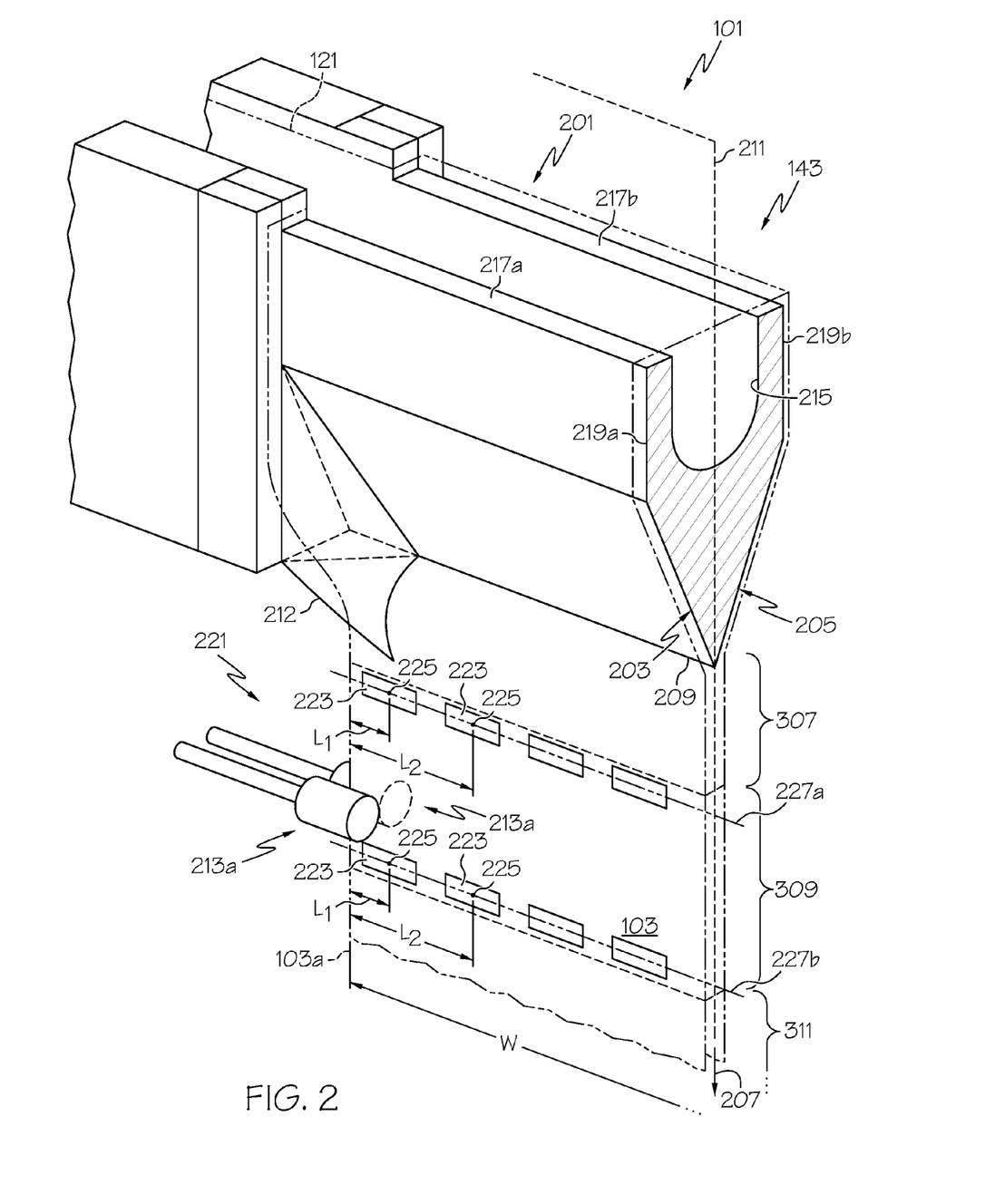
FIG. 2 illustrates a sectional view of a forming vessel of the apparatus along line 2-2 of FIG. 1.

FIG. 2 is a cross-sectional perspective view of the fusion draw apparatus 101 along line 2-2 of FIG. 1. As shown, the forming vessel 143 includes a forming wedge 201 comprising a pair of downwardly inclined forming surface portions 203, 205 extending between opposed ends of the forming wedge 201. The pair of downwardly inclined forming surface portions 203, 205 converge along a draw direction 207 to form a root 209. A draw plane 211 extends through the root 209 wherein the glass ribbon 103 may be drawn in the draw direction 207 along the draw plane 211. As shown, the draw plane 211 can bisect the root 209 although the draw plane 211 may extend at other orientations with respect to the root 209.

Figure 3:
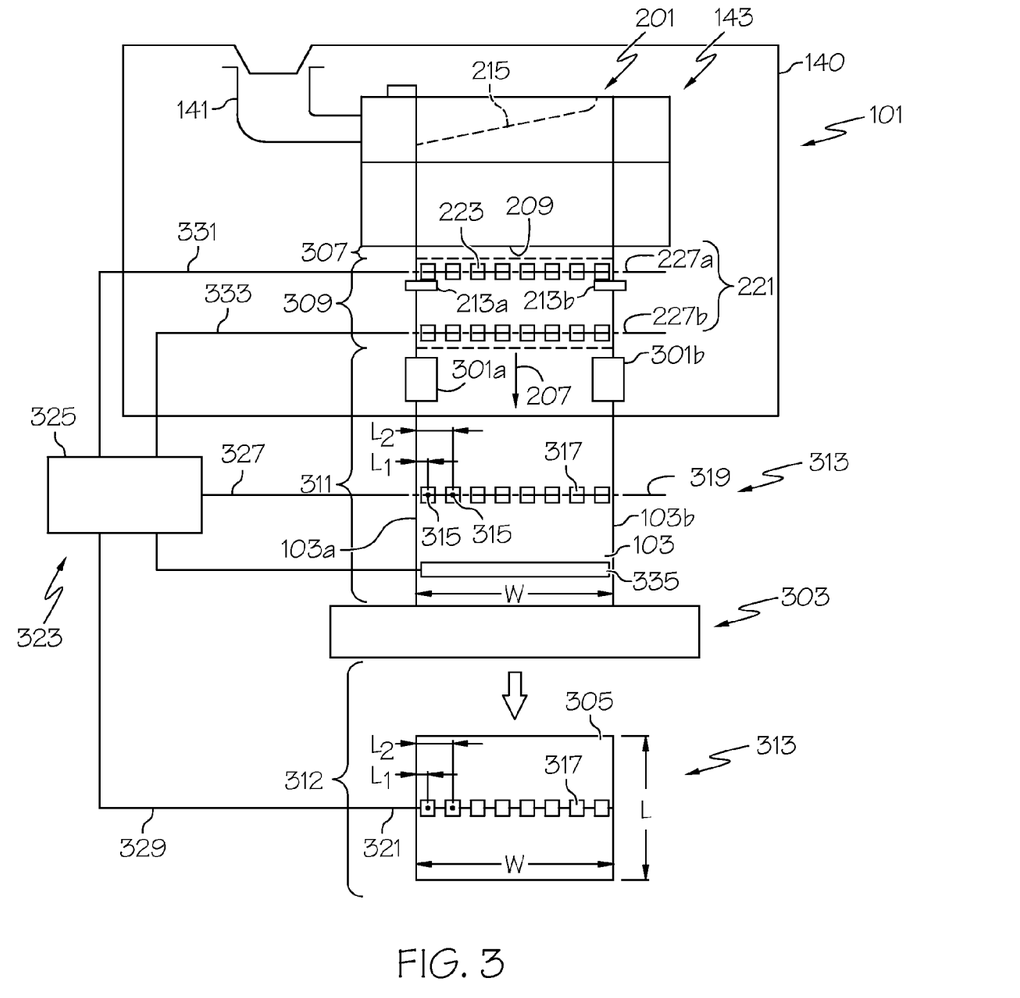
FIG. 3 schematically illustrates a glass ribbon being drawn off the forming vessel of FIG. 1.

The fusion draw apparatus 101 for fusion drawing a glass ribbon can also include at least one edge roller assembly including a pair of edge rollers configured to engage a corresponding edge 103a, 103b of the glass ribbon 103 as the ribbon is drawn off the root 209 of the forming wedge 201. The pair of edge rollers facilitates proper finishing of the edges of the glass ribbon. Edge roller finishing provides desired edge characteristics and proper fusion of the edge portions of the molten glass being pulled off opposed surfaces of an edge director 212 associated with the pair of downwardly inclined forming surface portions 203, 205. As shown in FIG. 2, a first edge roller assembly 213a is associated with the first edge 103a. FIG. 3 shows a second edge roller assembly 213b associated with the second edge 103b of the glass ribbon 103. Each edge roller assembly 213a, 213b can be substantially identical to one another although the pairs of edge rollers may have different characteristics in further examples. As shown in FIG. 1, once the edges 103a, 103b of the glass ribbon 103 are formed, a width "W" of the glass ribbon 103 is defined between the edges 103a, 103b in a direction substantially perpendicular to the draw direction 207.

As shown in FIG. 3, the fusion draw apparatus 101 can further include a first and second pull roll assembly 301a, 301b for each respective edge 103a, 103b to facilitate pulling of the glass ribbon 103 in the draw direction 207 of the draw plane 211.

The fusion draw apparatus 101 can further include a cutting device 303 that allows the glass ribbon 103 to be cut into distinct glass sheets 305. The glass sheets 305 may be subdivided into individual glass sheets for incorporating in the various display devices, such as a liquid crystal display (LCD). Cutting devices may include laser devices, mechanical scoring devices, traveling anvil machines and/or other devices configured to cut the glass ribbon 103 into the distinct glass sheets 305.

Referring to FIG. 2, in one example, the molten glass 121 can flow into a trough 215 of the forming vessel 143. The molten glass 121 can then simultaneously flow over corresponding weirs 217a, 217b and downward over the outer surfaces 219a, 219b of the corresponding weirs 217a, 217b. Respective streams of molten glass then flow along the downwardly inclined forming surface portions 203, 205 to the root 209 of the forming vessel 143, where the flows converge and fuse into the glass ribbon 103. The glass ribbon 103 is then drawn off the root 209 in the draw plane 211 along draw direction 207.

Turning to FIG. 3, the glass ribbon 103 is drawn from the root 209 in the draw direction 207 of the draw plane 211 from a viscous zone 307 to a setting zone 309. In the setting zone 309, the glass ribbon 103 is set from a viscous state to an elastic state with the desired cross-sectional profile. The glass ribbon is then drawn from the setting zone 309 to an elastic zone 311. In the elastic zone 311, the profile of the glass ribbon from the viscous zone 307 is frozen as a characteristic of the glass ribbon. While the set ribbon may be flexed away from this configuration, internal stresses can cause the glass ribbon to bias back to the original set profile.

As shown in FIGS. 2-3, any of the apparatus for producing glass ribbon 103 can include a temperature adjustment apparatus 221. For instance, as shown in FIG. 2, the temperature adjustment apparatus 221 can include a plurality of temperature adjustment elements 223 that can be positioned at respective lateral locations 225 along at least one temperature adjustment axis extending transverse, such as perpendicular, to the draw direction 207.

As shown, the temperature adjustment apparatus 221 can provide the at least one axis as a first temperature adjustment axis 227a and a second temperature adjustment axis 227b, although a single or three or more temperature adjustment axes may be provided in further examples. As shown, the first and second temperature adjustment axis 227a, 227b can each comprise a substantially straight axis although curved or other axis shapes may be provided in further examples. Still further, the first and second axis 227a, 227b are substantially parallel to one another although the axes may be angled with respect to one another in further examples.

The temperature adjustment axis may be located in a wide variety of elevations with respect to the glass ribbon. For example, as shown in FIGS. 2 and 3, the first and second temperature adjustment axis 227a, 227b are located within the setting zone 309. In addition, or alternatively, each or at least one temperature adjustment axis may be located within the viscous zone 307 and/or within the elastic zone 311 in further examples.

As mentioned previously, as shown in FIG. 2, the plurality of temperature adjustment elements 223 can be located at respective lateral locations 225, wherein the temperature adjustment elements are configured to adjust a transverse temperature profile of the glass ribbon 103 along the width "W" of the glass ribbon 103. As shown in FIG. 2, each of the plurality of temperature adjustment elements 223 on each temperature adjustment axis may be spaced from one another in series along the respective temperature adjustment axis. For example, as shown in FIG. 2, one of the temperature adjustment elements 223 may be located at a lateral location 225 that is a distance "$L_1$" from the edge 103a of the glass ribbon 103 while the adjacent temperature adjustment element 223 can be located a distance "$L_2$" from the edge 103a that is greater than the distance "$L_1$". In some examples the temperature adjustment elements 223 can be spaced equally from one another along the width "W" of the glass ribbon although the temperature adjustment elements may be located at different distances relative to the edges 103a, 103b of the glass ribbon. For example, the temperature adjustment elements 223 may be located closer together near the edges 103a, 103b when compared to a central region of the glass ribbon 103 to allow greater transfer of heat at the edges than the central portion of the glass ribbon.

As shown, the temperature adjustment elements 223 can be spaced apart from one another along a single row although a matrix of temperature adjustment elements may be provided in further examples. As shown, the temperature adjustment elements 223 can also be substantially identical to one another although different sized or types of elements may be used in further examples. For instance, in one example, the temperature adjustment element size and/or type may be designed to allow greater heat transfer to the edges when compared to the central portion of the glass ribbon. In one example, the temperature adjustment elements 223 can comprise heating coils wherein heat is generated by electrical resistance from electrical current passing through the heating coils.

As further illustrated in FIG. 3, the apparatus 101 can further include a stress sensor apparatus 313 configured to measure a stress characteristic of the glass ribbon 103 at respective locations 315 along the width "W" of the glass ribbon 103. The stress sensor apparatus, for example, can include at least one sensor element. For instance, a single sensor element may be provided that travels along the width of the glass ribbon 103 to measure a stress characteristic of the glass ribbon.

Alternatively, as shown, in further examples the stress sensor apparatus 313 can include a plurality of sensor elements 317 configured to measure a stress characteristic of the glass ribbon 103 at the respective locations 315 along the width "W" of the glass ribbon 103. In one example, the sensor elements 317 can be positioned at the respective locations 315 in series along at least one stress sensing axis. For instance, the plurality of sensor elements 317 can be positioned at respective locations 315 along a first stress sensing axis 319 and configured to extend along the width "W" of the glass ribbon 103 within the elastic zone 311. In addition or alternatively, the sensor elements 317 can be aligned along a second stress sensing axis 321 within a severed zone 312 while extending across a width "W" of the glass ribbon that forms distinct glass sheets 305 that have been severed from the upstream portion of the glass ribbon 103.

A single first stress sensing axis 319 can be provided within the elastic zone 311 and/or a single second stress sensing axis 321 can be provided within the severed zone 312. In further examples, a plurality of sensor axes may be provided within the elastic zone 311 and/or within the severed zone 312. In such examples, the plurality of respective sensor axes may be substantially parallel to one another although the axes may be angled from one another in further examples. Still further, as shown, each stress sensing axis 319, 321 may be substantially straight although the sensor axes may be curved or have different profiles in further examples. As shown, both of the sensing axis 319, 321 extend substantially perpendicular, to the draw direction 207. Although not shown, one or both of the sensing axes may be positioned at other orientations transverse to the draw direction 207.

In the example shown in FIG. 3, an outermost sensor element 317 may be located at a lateral location 315 that is a distance "$L_1$" from the edge 103a of the glass ribbon 103 while the adjacent sensor element 317 can be located a distance "$L_2$" from the edge 103a that is greater than the distance "$L_1$". In some examples the sensor elements 317 can be spaced equally from one another along the width "W" of the glass ribbon although sensor elements may be located at different distances relative to the edges 103a, 103b of the glass ribbon. For example, the sensor elements 317 may be located closer together near the edges 103a, 103b when compared to a central region of the glass ribbon 103 to allow sensing that matches the location of the corresponding laterally spaced temperature adjustment elements 223. As such, the plurality of sensor elements 317 may be configured to measure a stress characteristic of the glass ribbon 103 at respective locations 315 along the stress sensing axis 319, 321 that corresponds to the lateral location 225 of a corresponding temperature adjustment element 223 of the plurality of temperature adjustment elements 223.

The sensor elements 317 can comprise various configurations adapted to sense stress at a particular location of the glass ribbon 103 before and/or after severing the glass ribbon. In one example, the sensor element 317 can comprise a device configured to use polarized light to determine stress at a particular location. With such examples, the polarized light can be used to determine the stress characteristic without destroying the glass ribbon. As such, the stress sensor apparatus 313 can facilitate periodic, such as continuous, monitoring of a stress condition at a particular lateral location of the glass ribbon before and/or after severing the glass ribbon.

As also illustrated in FIG. 3, the apparatus 101 can further include a control device 323 configured for at least periodic, such as continuous, thermal stress compensation of the glass ribbon 103 by independently adjusting operation of the temperature adjustment elements 223 based on stress characteristic information at least periodically, such as continuously, obtained from the stress sensor apparatus 313. In one example, the control device 323 can include a controller 325 in communication with the plurality of temperature adjustment elements 223 and the sensor elements 317. For example, as shown the plurality of sensor elements 317 associated with the stress sensing axes 319, 321 can be placed in communication with the controller 325 by way of communication lines 327, 329. Likewise, the plurality of temperature adjustment elements 223 associated with the temperature adjustment axes 227a, 227b can be placed in communication with the controller 325 by way of respective communication lines 331, 333.

In one example, the control device 323 can comprise a database listing a relationship between power adjustments and corresponding impact on a stress characteristic of a glass sheet. For example, the database can be based on a fixed listing of previous power adjustments and the corresponding observed impact on stress characteristic. In one example, the database is fixed, wherein the same database may be used for future power adjustments to compensate for stress within the glass ribbon. In further examples, the database may be dynamic, wherein the database may be updated over time to include new data. For example, the database may be configured to adapt the relationship between the power adjustments and the corresponding impact on the stress characteristic of the glass sheet based on the stress characteristic information obtained from the stress sensor apparatus after adjusting the operation of the temperature adjustment elements.

In further examples, the control device 323 can logically carry out power adjustments to minimize a stress characteristic of the glass ribbon 103. For example, a mathematical model of the relationships between temperature adjustment element power moves and resulting stress within the glass ribbon can be used to carry out the power adjustments. An example of a nonlinear dynamic expression relating winding power to stress can be represented by equations (1) below:

$$\dot{s} = f(s) + g(s)p$$
$$s_o = s \qquad (1)$$

where s is a vector of stress points, p is a vector of winding powers, the functions $f$ and $g$ are appropriately sized vector fields, and $s_o$ is the output stress vector.

An example of a nonlinear dynamic expression relating winding power to stress can be represented by the following equation (2) below:

$$s = Kp \qquad (2)$$

where K is an appropriately sized matrix mapping power to stress. Equation (2) may be derived from equation (1) above during static conditions.

In still further examples, the control device 323 can optionally incorporate a fuzzy logic controller although other control devices may be used in further examples.

In further examples, the apparatus 101 can include a parameter sensor 335 configured to sense a condition of a parameter associated with the apparatus 101. For example, the parameter sensor 335 sense a condition that may indicate that mechanically induced stress is dominant in the glass ribbon. In such situations, it may be beneficial to avoid attempting to reduce thermal-related stress until mechanical-related stresses are mitigated. In one example, the parameter sensor 335 can be a motion sensor to determine a motion of the glass ribbon. In another example, the parameter sensor 335 may comprise a temperature sensor to determine temperature differentials across the width of the glass ribbon. In still further examples, the parameter sensor 335 may comprise a proximity sensor configured to measure a shape of the glass ribbon. In still further examples, the parameter sensor 335 can comprise a laser or other device configured to determine a physical condition of the glass ribbon. With any such examples including a parameter sensor, a condition of the parameter associated with the apparatus 101 may be sensed after which the control device 323 is configured to prevent thermal stress compensation if a predetermined condition is sensed by the parameter sensor 335.

Methods of producing the glass ribbon 103 will now be described with respect to FIGS. 1-4. As described above, the molten glass 121 can be drawn in the draw direction 207 to form the glass ribbon 103 including opposed edges 103a, 103b extending in the draw direction 207. As mentioned previously and as shown in FIG. 1, the opposed edges 103a, 103b are spaced apart along the width "W" of the glass ribbon 103 that is transverse to the draw direction 207.

The method further includes the step of drawing the molten glass 121 from the viscous zone 307 into a setting zone 309 downstream from the viscous zone 307, wherein the glass ribbon 103 is set from a viscous state to an elastic state. The method still further includes the step of drawing the glass ribbon 103 into the elastic zone 311 downstream from the setting zone 309.

Figure 4:
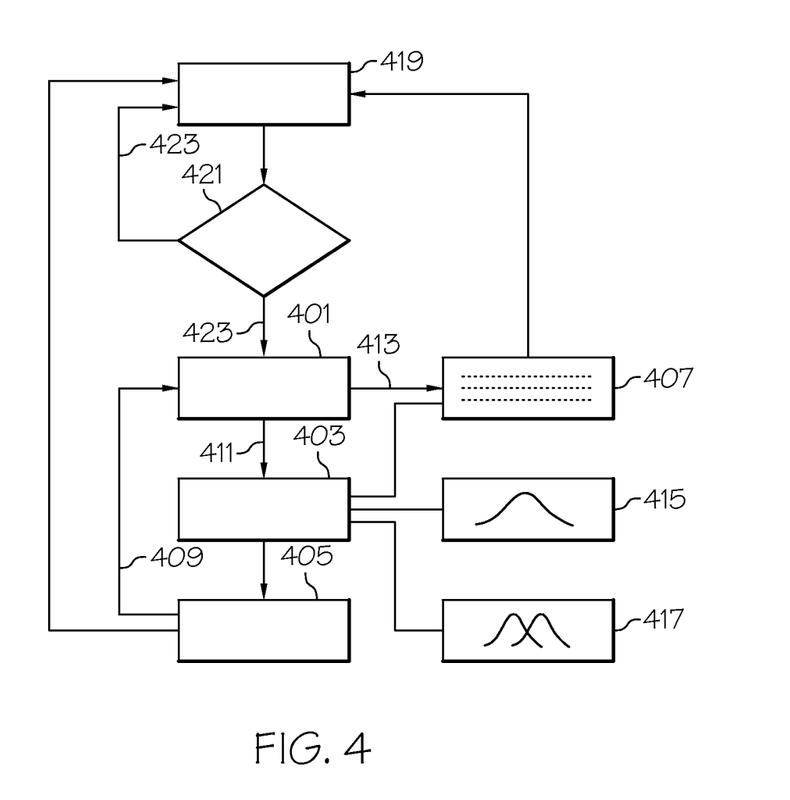
FIG. 4 illustrates example process steps for producing a glass ribbon in accordance with aspects of the disclosure.

Referring to FIG. 4, in one example, the method can then continue with the step 401 of sensing a stress characteristic of the glass ribbon 103 at respective lateral locations along the width "W" of the glass ribbon 103. For example, as shown in FIG. 3, the plurality of sensor elements 317 can at least periodically sense a stress characteristic associated with the respective lateral location (e.g., $L_1$, $L_2$, etc.) of the glass ribbon 103. In further examples, the sensors may continuously measure the stress characteristic associated with the respective lateral location of the glass ribbon.

As shown in FIG. 3, the sensors may be aligned along the first stress sensing axis 319 to at least periodically, such as continuously, measure the stress characteristic associated with the respective lateral location of the glass ribbon within the elastic zone 311 prior to severing the glass ribbon into distinct glass sheets 305.

In addition, or alternatively, as further shown in FIG. 3, the sensors may be aligned along the second stress sensing axis 321 to at least periodically, such as continuously, measure the stress characteristic associated with the respective lateral location of the glass ribbon after the glass sheet 305 is severed from the glass ribbon. In such an example, the sensors may measure the stress characteristic along the length of every glass sheet 305. For example, the sensors may carry out a signal measurement of the stress characteristic along the second stress sensing axis at a particular location along the length of every glass sheet 305. In such an example, the sensors periodically measure each glass sheet a single time. In further examples, the sensors may carry out periodic measurements of the stress characteristic along the second stress sensing axis 321 at multiple locations along the length of every glass sheet 305. In still further examples, the sensors may carry out continuous measurements of the stress characteristic along the second stress sensing axis along substantially or the entire length of every glass sheet 305.

In further examples, the sensors may be designed to periodically measure stress characteristic information of less than all of the glass sheets 305. Periodically measuring stress characteristic information in less than all of the glass sheets 305 may be desirable, for example, if the measurement process would damage or destroy the glass sheet. In such examples, a sufficient number of sheets may be periodically examined, as mentioned above, to accommodate changes in stress characteristic information while minimizing material waste due to destructive testing of the glass sheets. In one example, at least one glass sheet may be measured every 24 hours, such as every 4 hours, such as every hour. In further examples, at least one glass sheet out of 60 glass sheets may be measured, such as at least one glass sheet out of 240 glass sheets, such as at least one glass sheet out of 1440 glass sheets. In further examples, other percentages of glass sheets or times between measuring glass sheets may be selected based on the particular application.

In further examples, the method can include the step of averaging the stress characteristic in a longitudinal direction to obtain an average stress characteristic at each lateral location along the width "W" of the glass ribbon 103, wherein the average stress characteristics can be used in subsequent steps 403 and 405 discussed below. For instance, the average stress observed by each sensor element 317 may determine the average stress characteristic at that particular lateral location over a period of time.

Turning back to FIG. 4, the method can then include the steps 403 of determining an adjustment for the temperature adjustment elements 223 and then the step 405 of changing the transverse temperature profile of the glass ribbon 103 by independently adjusting operation of the plurality of temperature adjustment elements 223 positioned along the width "W" of the glass ribbon 103 in at least one of the viscous zone 307, the setting zone 309 and the elastic zone 311. As schematically illustrated in FIG. 4, the determination can be based on stress characteristic information obtained during the step 401 of sensing.

The step 403 of determining an adjustment for the temperature adjustment elements 223 can be carried out with various techniques. For example, as schematically shown in FIG. 4, a database 407 of power adjustments and corresponding impact on a stress characteristic of a glass sheet can be provided. In some examples, the database can be created by actual observed impacts on a stress characteristic based on a particular power move. In further examples, the database 407 can be obtained using a model of an apparatus for producing glass ribbon. In still further examples, a model may be used to create an initial database 407 that is updated with actual observed impacts on the stress characteristic based on subsequent power moves.

As such, the desired stress move can be matched as closely as possible with the database of achieved stress moves. The corresponding power move associated with the closest stress move in the database can then be selected. Alternatively, the power move can be interpolated between the two closest power moves. Once the power move is determined, the power move for each temperature adjustment element 223 can be adjusted by the determined power move. As such, it will be appreciated that the power to one or all of the temperature adjustment elements 223 may be independently adjusted by comparison of the stress characteristic information obtained with a database of power adjustments and corresponding previously observed impact on a stress characteristic of a glass sheet.

In some examples, the database 407 may remain static, and thereby remain unchanged over a period of time or until updated, if ever, at some time in the future. For example, as shown in FIG. 4, after the step 405 of changing the transverse temperature profile of the glass ribbon 103 by independently adjusting operation of the plurality of temperature adjustment elements 223, the method may return to the step 401 of sensing as indicated by arrow 409. Next, the method may again carry out the step 403 of determining the adjustment for the temperature adjustment elements 223 as indicated by arrow 411.

Alternatively, the method can further comprise the step of adapting the database 407 of the power adjustments and the corresponding impact on the stress characteristic of the glass sheet based on the stress characteristic information obtained after adjusting the operation of the temperature adjustment elements 223. For example, referring to FIG. 4, after the step 405 of changing the transverse temperature profile of the glass ribbon 103 by independently adjusting operation of the plurality of temperature adjustment elements 223, the method may return to the step 401 of sensing as indicated by arrow 409. Next, as indicated by arrow 413, the database 407 can be adapted (e.g., updated) based on the stress characteristic information sensed after adjusting the temperature adjustment elements in accordance with the determination made during step 403. In one example, the database can increase in size with each update. Alternatively, older information in the database can be substituted with newer information.

The step 403 of determining an adjustment for the temperature adjustment elements 223 can also be carried out with alternative methods. For example, the power adjustments may be calculated using a formula as indicated by box 415 and referenced by equations (1) and (2) above. In further examples, the power adjustments may be determined by fuzzy logic as indicated by box 417.

The method can also be designed to prevent the temperature adjustment elements from operating beyond the specifications of the temperature adjustment element that may cause failure of the temperature adjustment element. If the adjustment of the power provided to the temperature adjustment element intended to be adjusted would result in an adjusted power that exceeds a maximum amount of power allowed for the temperature adjustment element, the power to an adjacent temperature adjustment element may be adjusted. The adjacent element can be a single element or two elements straddling the intended temperature adjustment element. For instance, the excess temperature move can be divided in half and added to the two adjacent temperature adjustment elements.

As mentioned previously, the method can begin with the step 401 of sensing. Alternatively, as shown in FIG. 4, the method may include, such as begin with, step 419 of measuring a parameter associated with mechanically induced stress in the glass ribbon 103. Once the parameter is measured, a decision block 421 is used to prevent thermal stress compensation if the measured parameter is outside an operating range associated with the parameter. For example, the parameter sensor 335 (see FIG. 3) may comprise a motion sensor that determines if the ribbon is swinging or otherwise moving outside of acceptable ranges. If the ribbon is swinging with a large enough amplitude, mechanical stress from the swinging motion may dominate the stress introduced to the glass ribbon. If this is the case, the method loops back to check the parameter again as indicated by arrow 423. Although not shown, looping back can trigger an audio, visual or other alarm and/or recording mechanism to help address the source of mechanically induced stress. If the parameters are within acceptable range(s), then the method can continue to the step 401 of sensing as indicated by arrow 423.

As such, example methods may optionally include the step 419 of measuring a parameter associated with mechanically induced stress in the glass ribbon 103. In some examples, the method can include the step of changing a transverse temperature profile of the glass ribbon only if the measured parameter is within an operating range associated with the parameter. If within the acceptable range, the transverse temperature profile can be changed by independently adjusting operation of a plurality of the temperature adjustment elements 223 positioned along the width "W" of the glass ribbon 103 in at least one of the viscous zone 307, the setting zone 309 and the elastic zone 311. As mentioned previously, the temperature adjustment elements 223 can be independently adjusted based on stress characteristic information obtained by the sensor elements 317 during the step of sensing the glass ribbon 103 at respective lateral locations (e.g., $L_1$, $L_2$, etc.) along the width "W" of the glass ribbon 103.

It will be apparent to those skilled in the art that various modifications and variations can be made to the present disclosure without departing from the spirit and scope of the invention. Thus, it is intended that the present invention cover the modifications and variations of this disclosure provided they come within the scope of the appended claims and their equivalents.

What is claimed is:

1. An apparatus for producing glass ribbon comprising:
   a drawing device configured to draw molten glass into a glass ribbon in a draw direction along a draw plane of the apparatus;
   a viscous zone located along the draw direction, a setting zone adjacent to the viscous zone along the draw direction wherein the glass ribbon is set from a viscous state to an elastic state with a desired cross-sectional profile, an elastic zone adjacent to the setting zone along the draw direction wherein the cross-sectional profile of the glass ribbon is frozen, and a severed zone wherein distinct glass sheets are formed by severing an upstream portion of the glass ribbon;
   a temperature adjustment apparatus including a plurality of temperature adjustment elements positioned at respective lateral locations along at least one temperature adjustment axis extending transverse to the draw direction, wherein the at least one temperature adjustment axis is located in one or more of the viscous zone, the setting zone, and the elastic zone, and wherein the temperature adjustment elements are configured to adjust a transverse temperature profile of the glass ribbon along a width of the glass ribbon;
   a stress sensor apparatus configured to measure a stress characteristic of the glass ribbon at respective lateral locations along a first stress sensing axis extending along a width of the glass ribbon located in the elastic zone and optionally along a second stress sensing axis located within the severed zone; and
   a control device configured for at least periodic thermal stress compensation of the glass ribbon by independently adjusting operation of the temperature adjustment elements based on stress characteristic information at least periodically obtained from the stress sensor apparatus.

2. The apparatus of claim 1, wherein the control device is configured for continuous thermal stress compensation of the glass ribbon by independently adjusting operation of the temperature adjustment elements based on stress characteristic information continuously obtained from the stress sensor apparatus.

3. The apparatus of claim 1, further comprising a parameter sensor configured to sense a condition of a parameter associated with the apparatus, wherein the control device is configured to prevent thermal stress compensation if a predetermined condition is sensed by the parameter sensor.

4. The apparatus of claim 1, wherein the stress sensor apparatus includes a plurality of sensor elements positioned at respective locations along at least one stress sensing axis configured to extend along the width of the glass ribbon.

5. The apparatus of claim 4, wherein the plurality of sensor elements are each configured to measure a stress characteristic of the glass ribbon at a location along the stress sensing axis that corresponds to the lateral location of a corresponding temperature adjustment element of the plurality of temperature adjustment elements.

6. The apparatus of claim 1, wherein the control device further comprises a database listing a relationship between power adjustments and corresponding impact on a stress characteristic of a glass sheet.

7. The apparatus of claim 6, wherein the database is configured to adapt the relationship between the power adjustments and the corresponding impact on the stress characteristic of the glass sheet based on the stress characteristic information obtained from the stress sensor apparatus after adjusting the operation of the temperature adjustment elements.

8. The apparatus of claim 1, wherein the control device comprises a fuzzy logic controller.

* * * * *